United States Patent
Pan

(10) Patent No.: US 12,362,569 B2
(45) Date of Patent: Jul. 15, 2025

(54) MAXIMUM POWER POINT TRACKING DEVICE AND OPERATION METHOD THEREOF

(71) Applicant: LITE-ON TECHNOLOGY CORPORATION, Taipei (TW)

(72) Inventor: Po-Hao Pan, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 39 days.

(21) Appl. No.: 18/525,911

(22) Filed: Dec. 1, 2023

(65) Prior Publication Data

US 2024/0305104 A1    Sep. 12, 2024

(30) Foreign Application Priority Data

Mar. 8, 2023  (TW) .................. 112108535

(51) Int. Cl.
*H02J 3/38* (2006.01)
*H02M 1/00* (2006.01)

(52) U.S. Cl.
CPC ............... *H02J 3/38* (2013.01); *H02J 3/381* (2013.01); *H02J 2300/26* (2020.01); *H02M 1/0006* (2021.05); *Y02E 10/56* (2013.01)

(58) Field of Classification Search
CPC .... H02J 3/381; H02J 2300/24–26; H02J 7/35; H02S 40/30–38; H02S 50/00; Y02E 10/56; H02M 1/0006
See application file for complete search history.

(56) References Cited

U.S. PATENT DOCUMENTS

2018/0287484 A1* 10/2018 Braginsky ............... H02J 3/381

FOREIGN PATENT DOCUMENTS

| CN | 101807850 A | * | 8/2010 |
| CN | 101902173 A | * | 12/2010 |
| CN | 102355124 B | * | 1/2014 |

(Continued)

OTHER PUBLICATIONS

English machine translation of CN101807850A published Aug. 18, 2010 (Year: 2010).*

(Continued)

*Primary Examiner* — Rexford N Barnie
*Assistant Examiner* — David A Shiao
(74) *Attorney, Agent, or Firm* — WPAT, PC

(57) ABSTRACT

A maximum power point tracking device and an operation method thereof are provided. The maximum power point tracking device includes a DC-to-DC converting circuit, a DC-to-AC inverting circuit, a controlling circuit, an auxiliary power supply and a power limiting circuit. The auxiliary power supply is connected to the DC-to-DC converting circuit, the DC-to-AC inverting circuit and the controlling circuit to provide power. The power limiting circuit is connected to a photovoltaic array and the auxiliary power supply. The power limiting circuit includes a dummy load path and an auxiliary power providing path. The dummy load path is used to provide a dummy load, when a photovoltaic power of the photovoltaic array is lower than a predetermined power. The auxiliary power providing path is used for providing the auxiliary power when the photovoltaic power of the photovoltaic array is higher than or equal to the predetermined power.

12 Claims, 8 Drawing Sheets

(56) References Cited

FOREIGN PATENT DOCUMENTS

| CN | 104348347 | A | * | 2/2015 | ............. H02J 3/383 |
|----|-----------|---|---|--------|--------------------------|
| CN | 105938380 | A | * | 9/2016 | ............. G05F 1/565 |
| CN | 206099750 | U | * | 4/2017 | |
| CN | 206977310 | U | * | 2/2018 | |
| CN | 106059280 | B | * | 4/2019 | |
| CN | 113904535 | A | * | 1/2022 | ....... H01L 31/02021 |
| CN | 114336755 | A | * | 4/2022 | |
| CN | 114448227 | A | * | 5/2022 | |

OTHER PUBLICATIONS

English machine translation of CN114448227A published May 6, 2022 (Year: 2022).*
English machine translation of CN206099750U published Apr. 12, 2017 (Year: 2017).*
English machine translation of CN1043484347A published Feb. 11, 2015 (Year: 2015).*

* cited by examiner

MAXIMUM POWER POINT TRACKING DEVICE AND OPERATION METHOD THEREOF

This application claims the benefit of Taiwan application Serial No. 112108535, filed Mar. 8, 2023, the disclosure of which is incorporated by reference herein in its entirety.

TECHNICAL FIELD

The disclosure relates in general to an electronic device and an operation method thereof, and more particularly to provide a maximum power point tracking device and an operation method thereof.

BACKGROUND

Maximum power point tracking (MPPT) is commonly used in wind turbines and photovoltaic solar systems to obtain the maximum power output of the photovoltaic array (PV array) under various circumstances.

In the early morning, dusk or cloudy days, the illumination is insufficient. The power that the photovoltaic array could provide is very small, causing the photovoltaic voltage of the photovoltaic array during power tracking to be unstable.

After the auxiliary power supply of the maximum power point tracking device is enabled, if the photovoltaic power of the photovoltaic array is not enough to support it, the auxiliary power supply will be turned off. At this time, the photovoltaic array is equivalent to an open circuit. When the photovoltaic voltage reaches the activating voltage of the auxiliary power supply, it will be enabled again. This behavior causes the auxiliary power supply to be enabled and disabled repeatedly, thereby making the entire system unstable.

SUMMARY

The disclosure is directed to a maximum power point tracking device and an operation method thereof. A power limiting circuit is created in front of the auxiliary power supply. When the photovoltaic voltage is still unstable, a dummy load is provided through the power limiting circuit so that the open circuit voltage does not float too much. When the auxiliary power supply is fully enable, the power limiting circuit could release the dummy load.

According to one embodiment, a maximum power point tracking (MPPT) device is provided. The maximum power point tracking device includes a DC-to-DC converting circuit, a DC-to-AC inverting circuit, a controlling circuit, an auxiliary power supply and a power limiting circuit. The DC-to-DC converting circuit is connected to a photovoltaic array (PV array). The DC-to-AC inverting circuit is connected to the DC-to-DC converting circuit. The controlling circuit is connected to the DC-to-DC converting circuit and the DC-to-AC inverting circuit. The auxiliary power supply is connected to the DC-to-DC converting circuit, the DC-to-AC inverting circuit and the controlling circuit, for providing a power. The power limiting circuit is connected to the photovoltaic array and the auxiliary power supply. The power limiting circuit includes a dummy load path and an auxiliary power providing path. The dummy load path is used to provide a dummy load, when a photovoltaic power of the photovoltaic array is lower than a predetermined power, so as to stabilize a photovoltaic voltage of the photovoltaic array. The auxiliary power providing path is used to enable the auxiliary power supply, when the photovoltaic power of the photovoltaic array is higher than or equal to the predetermined power.

According to another embodiment, an operation method of a maximum power point tracking (MPPT) device is provided. The operation method of the maximum power point tracking device includes the following steps. A dummy load path is formed to provide a dummy load to stabilize a photovoltaic voltage of a photovoltaic array, when a photovoltaic power of the photovoltaic array is lower than a predetermined power. An auxiliary power providing path is formed to enable an auxiliary power, when the photovoltaic power of the photovoltaic array is higher than or equal to the predetermined power.

According to another embodiment, a power limiting circuit connected to a photovoltaic array and an auxiliary power supply is provided. The power limiting circuit includes a dummy load path and an auxiliary power providing path. The dummy load path is used to provide a dummy load when a photovoltaic power of the photovoltaic array is lower, than a predetermined power, so as to stabilize a photovoltaic voltage of the photovoltaic array. The auxiliary power providing path is used to enable the auxiliary power supply, when the photovoltaic power of the photovoltaic array is higher than or equal to the predetermined power.

Figure 1:
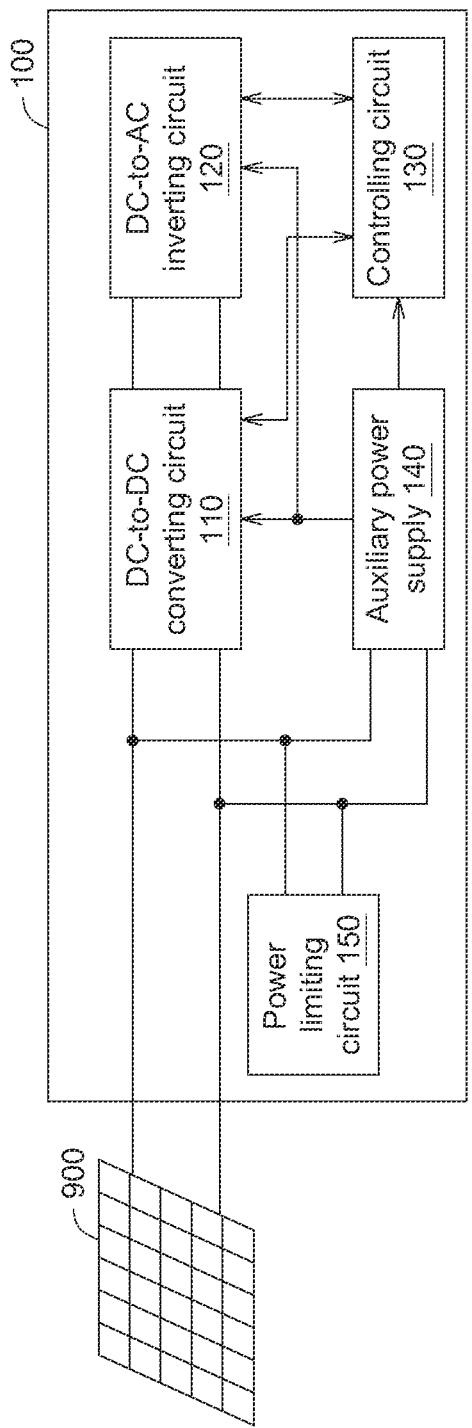
FIG. 1 illustrates a block diagram of a maximum power point tracking (MPPT) device according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Please refer to FIG. 1, which illustrates a block diagram of a maximum power point tracking (MPPT) device 100 according to an embodiment. The maximum power point tracking device 100 includes a DC-to-DC converting circuit 110, a DC-to-AC inverting circuit 120, a controlling circuit 130, an auxiliary power supply 140 and a power limiting circuit 150. The DC-to-DC converting circuit 110 is connected to a photovoltaic array (PV array) 900. The DC-to-AC inverting circuit 120 is connected to the DC-to-DC converting circuit 110. The controlling circuit 130 is connected to the DC-to-DC converting circuit 110 and the DC-to-AC inverting circuit 120. The auxiliary power supply 140 is connected to the DC-to-DC converter circuit 110, the DC-to-AC inverting circuit 120 and the controlling circuit 130 to provide power.

The power limiting circuit 150 is connected to the photovoltaic array 900 and the auxiliary power supply 140. In order to solve the problem of photovoltaic voltage floating in the photovoltaic array 900, the power limiting circuit 150 is created in front of the auxiliary power supply 140. When the photovoltaic voltage is still unstable, a dummy load is provided through the power limiting circuit 150 so that the open circuit voltage does not fluctuate too much. When the auxiliary power supply 140 is fully enabled, the power limiting circuit 150 could release the dummy load.

Figure 2:
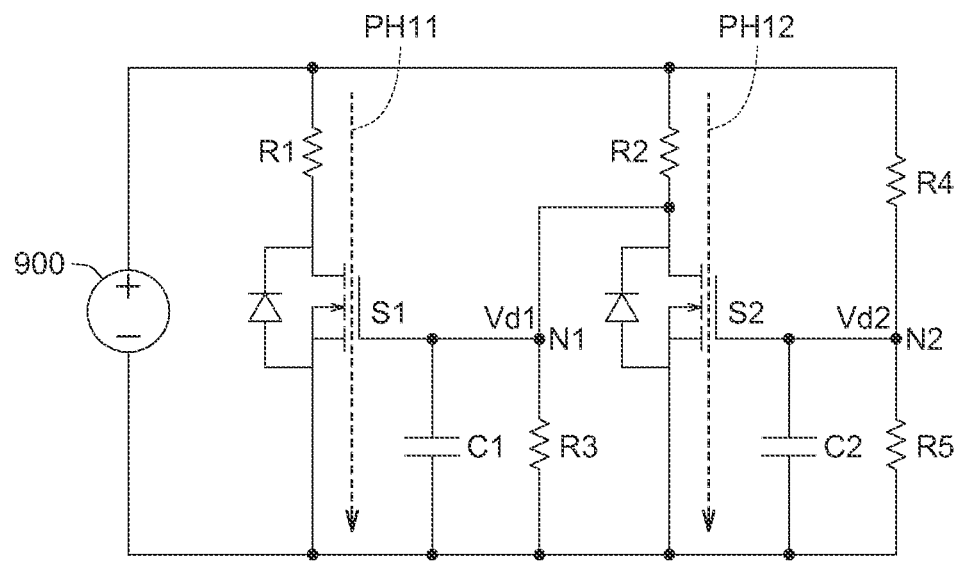
FIG. 2 illustrates a circuit diagram of the power limiting circuit according to an embodiment.

Please refer to FIG. 2, which illustrates a circuit diagram of the power limiting circuit 150 according to an embodiment. The power limiting circuit 150 includes, for example, a dummy load path PH11 and an auxiliary power providing path PH12. The dummy load path PH11 is used to provide the dummy load (for example, a first resistor R1) to stabilize the photovoltaic voltage of the photovoltaic array 900, when the photovoltaic power of the photovoltaic array 900 is lower than a predetermined power. The auxiliary power providing path PH12 is used to enable the auxiliary power supply 140 (shown in FIG. 1), when the photovoltaic power of the photovoltaic array 900 is higher than or equal to the predetermined power.

The power limiting circuit 150 includes, for example, the first resistor R1, a second resistor R2, a third resistor R3, a fourth resistor R4, a fifth resistor R5, a first transistor S1, a second transistor S2, a first capacitor C1 and a second capacitor C2. The first transistor S1 is connected to the first resistor R1. The first capacitor C1 is connected to the first transistor S1. The third resistor R3 is connected to the second resistor R2, and the first capacitor C1 is connected to a first node N1 connected between the second resistor R2 and the third resistor R3. The second transistor S2 is connected to the second resistor R2. The second capacitor C2 is connected to the second transistor S2. The fifth resistor R5 is connected to the fourth resistor R4. The second capacitor C2 is connected to a second node N2 connected between the fourth resistor R4 and the fifth resistor R5.

When the first transistor S1 is turned on, the first resistor R1 and the first transistor S1 form the dummy load path PH11. When the second transistor S2 is turned on, the second resistor R2 and the second transistor S2 form the auxiliary power providing path PH12. In the early morning, dusk or cloudy days the illumination is insufficient. The photovoltaic power provided by the photovoltaic array 900 is very small, and the power limiting circuit 150 will form the dummy load path PH11 first. After the photovoltaic power of the photovoltaic array 900 reaches the predetermined power, the power limiting circuit 150 will close the dummy load path PH11 and form the auxiliary power providing path PH12. The operation process of the power limiting circuit 150 is described in further detail below.

Figure 3A:
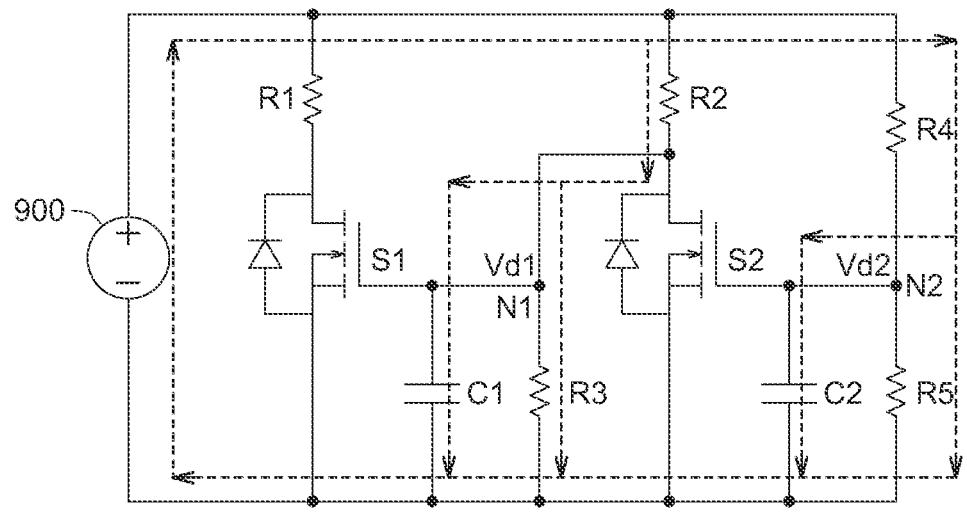
FIGS. 3A to 3C illustrate the operation of the power limiting circuit.
Figure 3B:
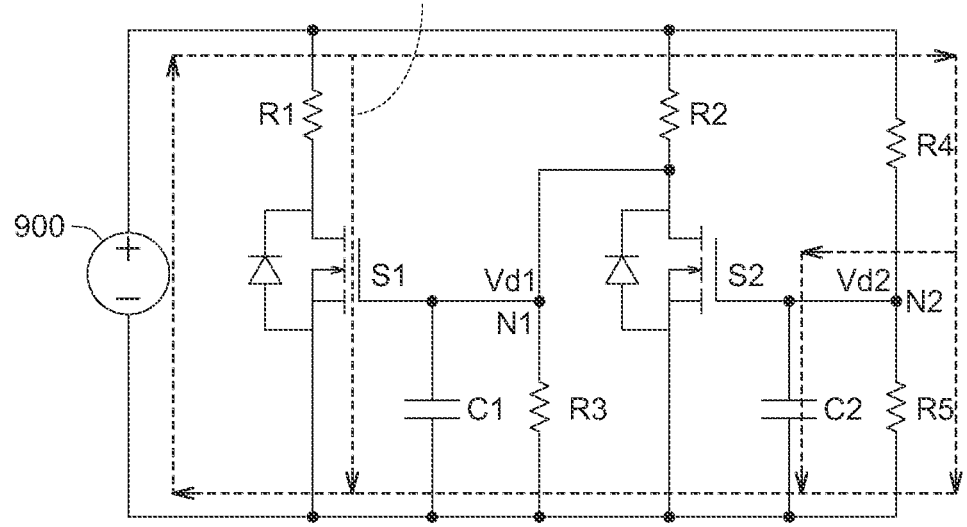
Figure 3C:
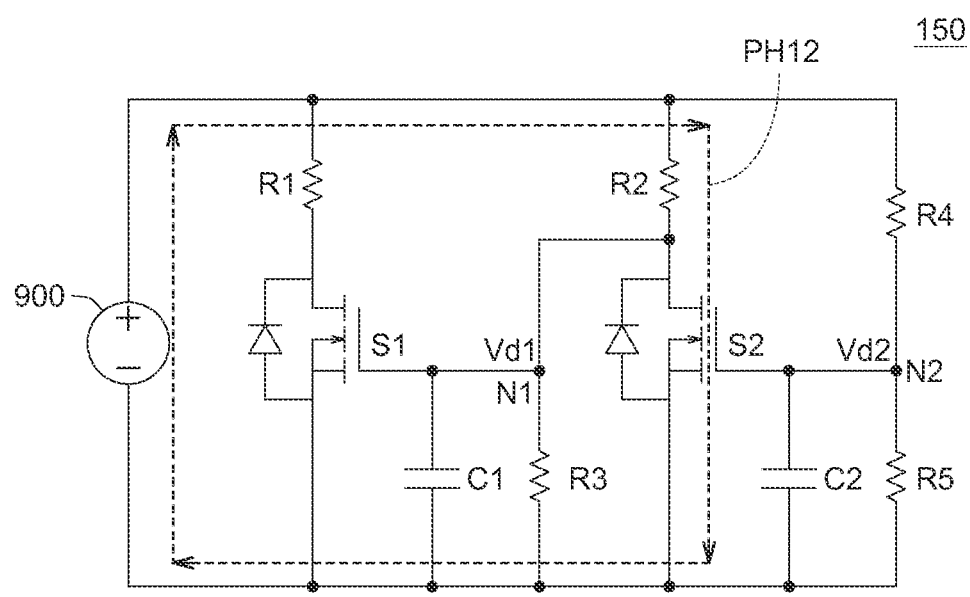

Please refer to FIGS. 3A to 3C, which illustrate the operation of the power limiting circuit 150. First, as shown in FIG. 3A, when the illumination is insufficient in the early morning, dusk or cloudy day, the photovoltaic array 900 will start to provide the photovoltaic voltage, charge the first capacitor C1 through a divided voltage Vd1 between the second resistor R2 and the third resistor R3, and charge the second capacitor C2 through a divided voltage Vd2 between the fourth resistor R4 and the fifth resistor R5. The divided voltage Vd2 between the fourth resistor R4 and the fifth resistor R5 is smaller than the divided voltage Vd1 between the second resistor R2 and third resistor R3.

As shown in FIG. 3B, when the first capacitor C1 is charged to a first predetermined voltage, the first transistor S1 is turned on. After the first transistor S1 is turned on, the dummy load path PH11 is formed. The first resistor R1 provides stable load power to the photovoltaic voltage so that the photovoltaic voltage does not float. At this time, the dummy load provided by the first resistor R1 can stabilize the photovoltaic voltage of the photovoltaic array 900 and maintain the auxiliary power supply 140 in an off state.

Then, as shown in FIG. 3C, when the photovoltaic voltage increases as the illumination increases, the divided voltage Vd2 between the fourth resistor R4 and the fifth resistor R5 charges the second capacitor C2 to a second predetermined voltage, causing the second transistor S2 to be turned on.

When the second transistor S2 is turned on, the second resistor R2 and the second transistor S2 form the auxiliary power providing path PH12. At this time, the first capacitor C1 is discharged, and the first transistor S1 will be turned off, causing the dummy load provided by the first resistor R1 to be released.

According to the description in FIG. 3A to FIG. 3C above, when the photovoltaic voltage is still unstable, the dummy load can be provided through the power limiting circuit 150 so that the open circuit voltage will not float too much. When the auxiliary power supply 140 is fully enabled, the limiting circuit 150 will release the dummy load.

After the auxiliary power providing path PH12 is formed, the photovoltaic voltage may be too low again due to cloudy days or dusk, and the second transistor S2 could not continue to be turned on. At this time, as shown in FIG. 3A, the second transistor S2 will be closed. Then, as shown in FIG. 3B, after the divided voltage Vd1 between the second resistor R2 and the third resistor R3 charges the first capacitor C1 to the first predetermined voltage, the first transistor S1 will be turned on, and the dummy load path PH11 will be formed, so that the first resistor R1 could keep on providing the dummy load to the photovoltaic array 900.

Figure 4:
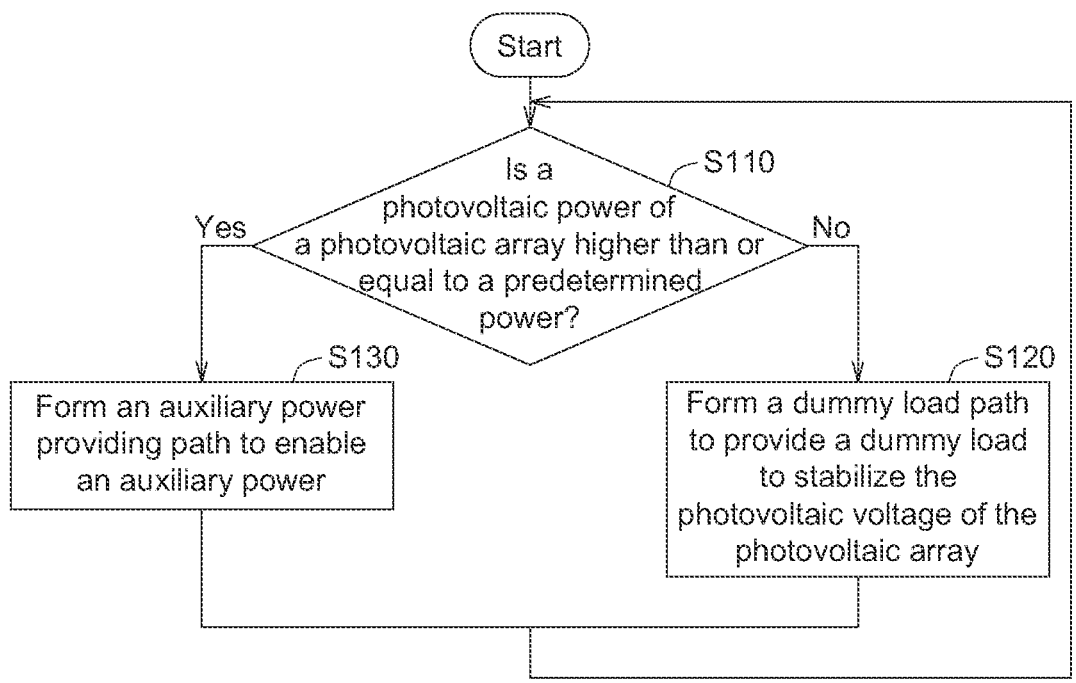
FIG. 4 illustrates a flow chart of an operation method of the maximum power point tracking device according to an embodiment.

Please refer to FIG. 4, which illustrates a flow chart of an operation method of the maximum power point tracking device 100 according to an embodiment. According to the above embodiment, the operation method of the maximum power point tracking device 100 includes the following steps. In step S110, whether the photovoltaic power of the photovoltaic array 900 is higher than or equal to the predetermined power is determined. If the photovoltaic power of the photovoltaic array 900 is lower than the predetermined power, then the process proceeds to step S120; if the photovoltaic power of the photovoltaic array 900 is higher than or equal to the predetermined power, then the process proceeds to step S130. In this step, for example, whether the second transistor S2 can be turned on is used to determine whether the photovoltaic power of the photovoltaic array 900 is higher than or equal to the predetermined power.

In step S120, as shown in FIGS. 3A to 3B, the power limiting circuit 150 forms the dummy load path PH11 to provide the dummy load to stabilize the photovoltaic voltage of the photovoltaic array 900.

In step S130, as shown in FIGS. 3B to 3C, the power limiting circuit 150 forms the auxiliary power providing path PH12 to enable the auxiliary power supply 140 (shown in FIG. 1).

Then, the process returns to the step S110 to determine whether it is necessary to switch between the step S120 and the step S130.

Figure 5:
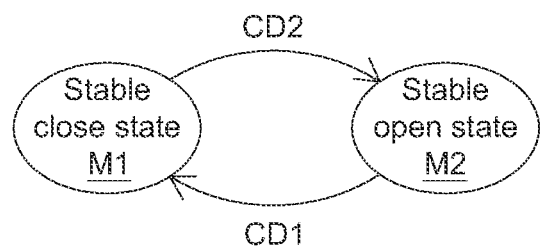
FIG. 5 illustrates a state machine diagram of the auxiliary power supply according to one embodiment.

Please refer to FIG. 5, which illustrates a state machine diagram of the auxiliary power supply 140 according to one embodiment. In this embodiment, the auxiliary power supply 140 has a stable closed state M1 and a stable open state M2 through the above technology. When a first condition CD1 is satisfied, the auxiliary power supply 140 will enter the stable close state M1; when a second condition CD2 is satisfied, the auxiliary power supply 140 will enter the stable open state M2. The first condition CD1 is, for example, the photovoltaic power of the photovoltaic array 900 is lower than the predetermined power; the second condition CD2 is, for example, the photovoltaic power of the photovoltaic array 900 is higher than or equal to the predetermined power. In this way, the auxiliary power supply 140 will not be turned on and off frequently in the early morning, dusk or cloudy days when the illumination is insufficient.

In addition to the above embodiments, the system stability effect can be achieved through the following embodiments. Please refer to FIGS. 6A to 6B, which illustrate a maximum power point tracking device 200 according to another embodiment. The maximum power point tracking device 200 further includes a flyback circuit 260. The flyback circuit 260 is connected to the auxiliary power supply 140. The power limiting circuit 250 further includes a diode D1. The second capacitor C2 is connected to the diode D1. The diode D1 is connected to a power supply voltage node N3 connected between the flyback circuit 260 and the auxiliary power supply 140, to provide a power supply voltage Vcc1 and charge the second capacitor C2.

Figure 6A:
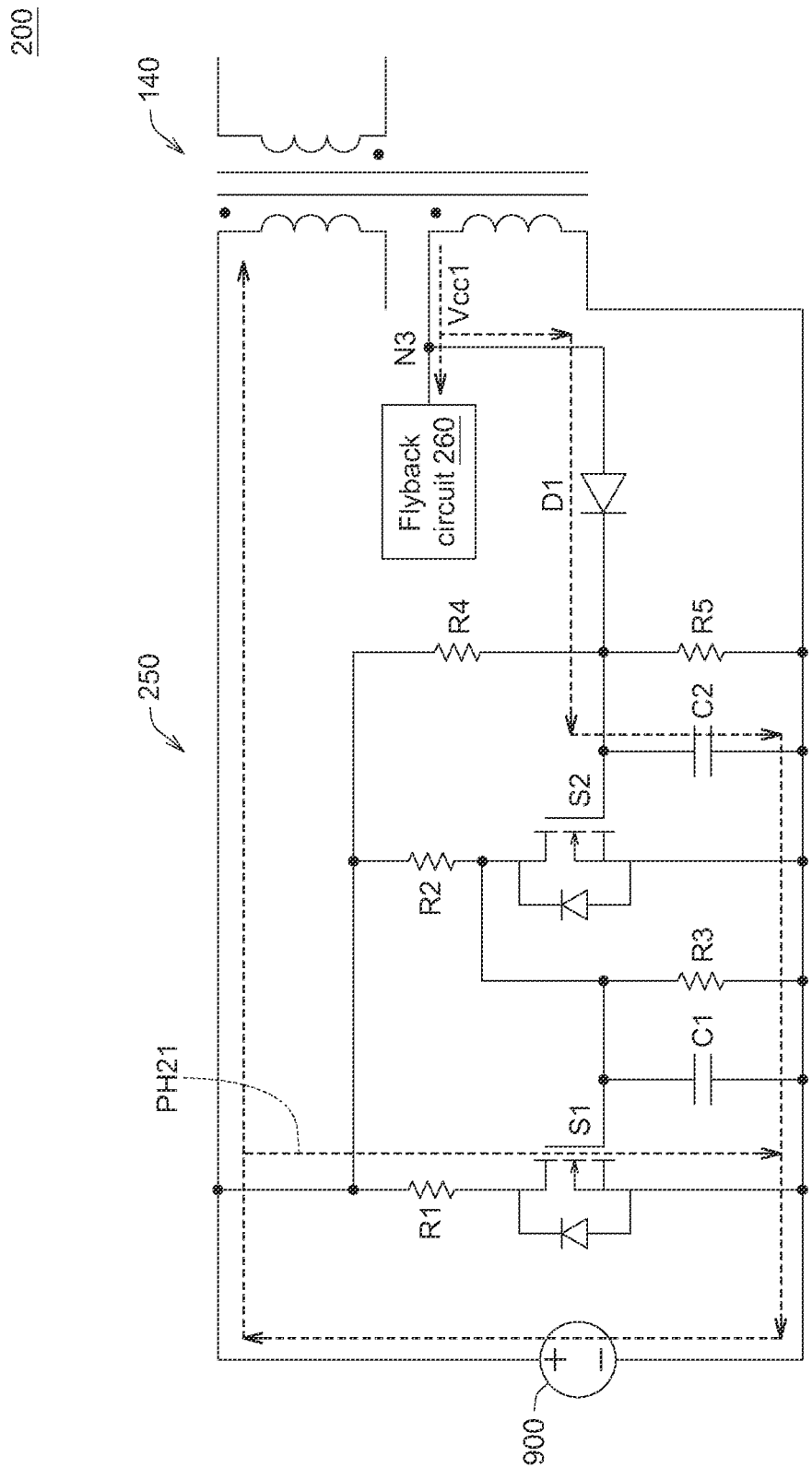
FIGS. 6A to 6B illustrate a maximum power point tracking device according to another embodiment.

As shown in FIG. 6A, when the photovoltaic array 900 first provides photovoltaic power, the power supply voltage Vcc1 is lower than the second predetermined voltage of the second transistor S2. The second transistor S2 will be turned off, and the first transistor S1 will be turned on, so that the dummy load path PH21 will be formed.

Figure 6B:
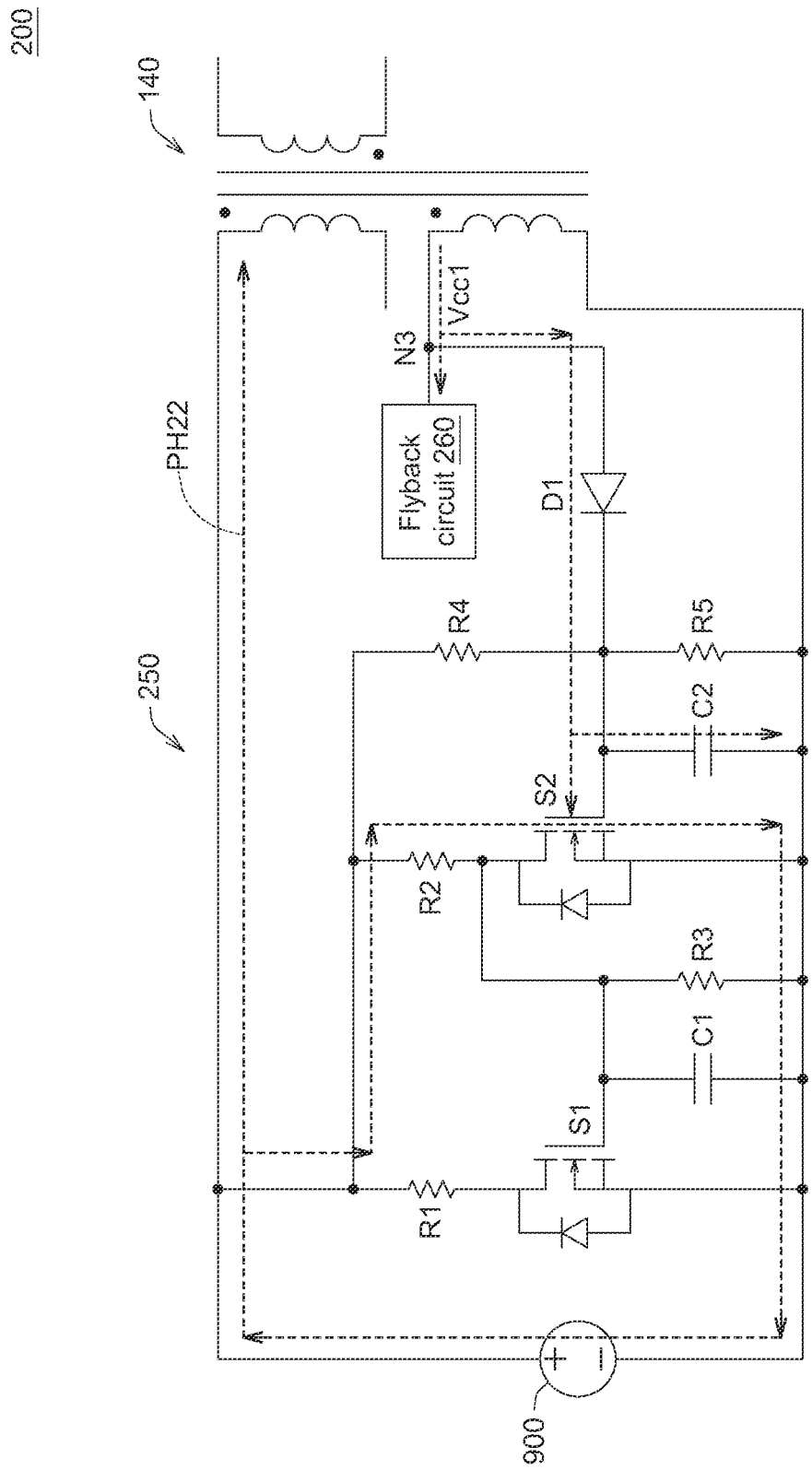

As shown in FIG. 6B, as the photovoltaic array 900 gradually increases the photovoltaic power, the power supply voltage Vcc1 will be higher than or equal to the second predetermined voltage of the second transistor S2, and the auxiliary power providing path PH22 will be formed.

According to the description in FIG. 6A to FIG. 6B above, when the photovoltaic voltage is still unstable, the dummy load can be provided through the power limiting circuit 250 so that the open circuit voltage does not float too much. When the auxiliary power supply 140 is fully enabled, the power limiting circuit 250 could release the dummy load.

After the auxiliary power providing path PH22 is formed, the photovoltaic voltage may be too low due to cloudy days or dusk, causing the power supply voltage Vcc1 to be lower than the second predetermined voltage of the second transistor S2. At this time, the second transistor S2 will be turned off, and the first transistor S1 will be turned on, and the dummy load path PH21 will be formed, so that the first resistor R1 can keep on providing the dummy load to the photovoltaic array 900.

Figure 7:
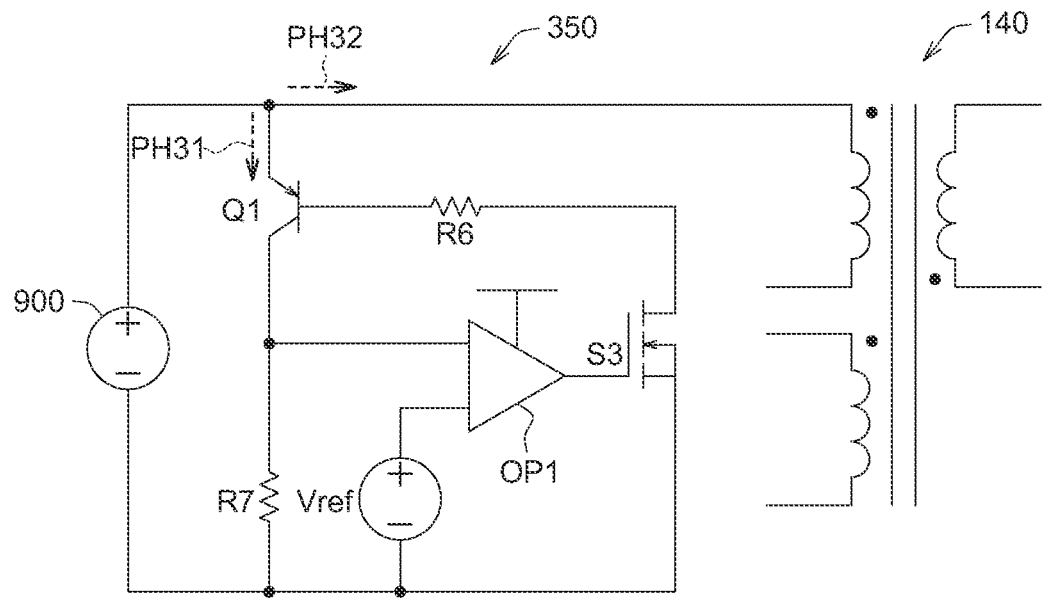
FIG. 7 illustrates a maximum power point tracking device according to another embodiment.

Please refer to FIG. 7, which illustrates a maximum power point tracking device 300 according to another embodiment. The power limiting circuit 350 of the maximum power point tracking device 300 includes a switching component Q1, a sixth resistor R6, a seventh resistor R7, a comparator OP1 and a third transistor S3. The switching component Q1 is connected to the sixth resistor R6 and the seventh resistor R7, and the sixth resistor R6 is connected to the third transistor S3. An input terminal of the comparator OP1 is connected to the seventh resistor R7 and a reference voltage Vref. An output end of the comparator OP1 is connected to the third transistor S3.

In FIG. 7, the maximum power point tracking device 300 stabilizes the photovoltaic voltage through the short circuit of the photovoltaic array 900. When the photovoltaic array 900 starts to provide photovoltaic voltage, the third transistor S3 is connected to the switching component Q1, so that most of the current passes through the switching component Q1, and the seventh resistor R7 is used as a dummy load to stabilize the photovoltaic voltage. When the third transistor S3 is connected to the switching component Q1, the seventh resistor R7 and the switching component Q1 form a dummy load path PH31, so that the seventh resistor R7 can provide dummy load to the photovoltaic array 900.

As the photovoltaic power of the photovoltaic array 900 rises, the voltage of the seventh resistor R7 also rises until the third transistor S3 is turned off. At this time, an auxiliary power providing path PH32 is formed, and all the photovoltaic power of the photovoltaic array 900 will be provided to the auxiliary power supply 140 to stably enable the auxiliary power supply 140.

According to the explanation in FIG. 7 above, when the photovoltaic voltage is still unstable, the dummy load can be provided through the power limiting circuit 350 so that the open circuit voltage does not float too much. When the auxiliary power supply 140 is fully enabled, the power limiting circuit 350 could release the dummy load.

Figure 8:
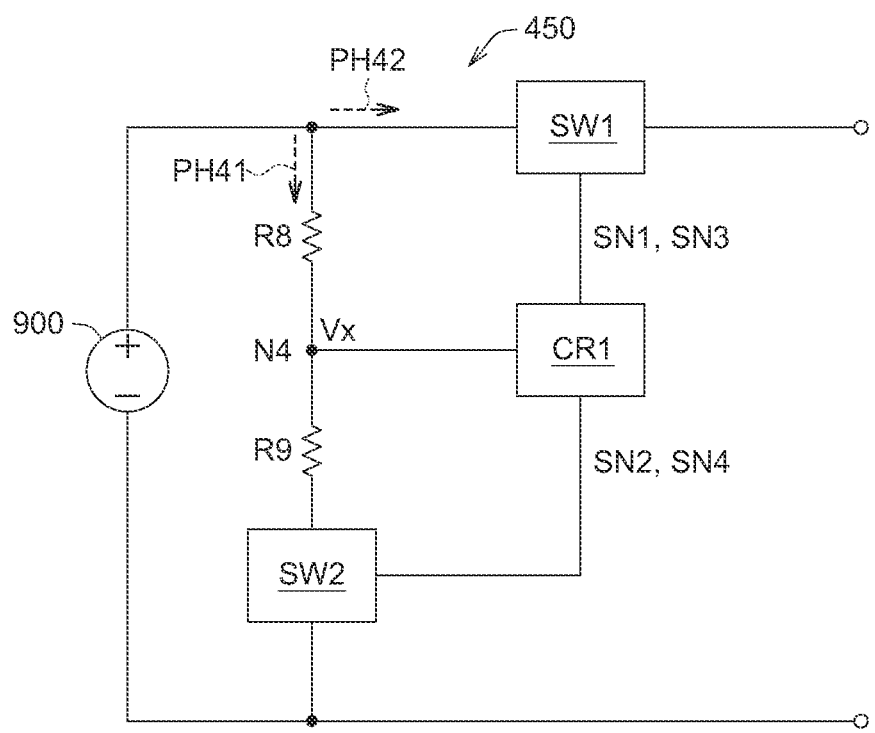
FIG. 8 illustrates a maximum power point tracking device according to another embodiment.

Please refer to FIG. 8, which illustrates a maximum power point tracking device 400 according to another embodiment. The power limiting circuit 450 of the maximum power point tracking device 400 includes an eighth resistor R8, a ninth resistor R9, a first switch SW1, a second switch SW2 and a control element CR1. The eighth resistor R8 is connected to the photovoltaic array 900. The ninth resistor R9 is connected to the eighth resistor R8. The first switch SW1 is connected to the eighth resistor R8. The second switch SW2 is connected to the ninth resistor R9. The control element CR1 is connected to the first switch SW1, the second switch SW2 and a voltage dividing node N4 connected between the eighth resistor R8 and the ninth resistor R9.

When the photovoltaic array 900 starts to provide photovoltaic voltage, the second switch SW2 is turned on and the first switch SW1 is turned off. The eighth resistor R8, the ninth resistor R9 and the second switch SW2 form a dummy load path PH41, so that the eighth resistor R8 provides the dummy load to the photovoltaic array 900.

The eighth resistor R8 and the ninth resistor R9 form a divided voltage mechanism. The control element CR1 detects a divided voltage Vx. When the divided voltage Vx is higher than a predetermined voltage, the control element CR1 generates a first control signal SN1 and a second control signal SN2 to turn on the first switch SW1 and turn off the second switch SW2, for forming an auxiliary power providing path PH42.

After the auxiliary power providing path PH42 is turned on, the photovoltaic voltage of the photovoltaic array 900 may decrease due to cloudy weather or dusk, and the divided voltage Vx may also decrease accordingly. When the divided voltage Vx is lower than the predetermined voltage, the control element CR1 generates a third control signal SN3 and a fourth control signal SN4 to turn off the first switch SW1 and turn on the second switch SW2, for forming a dummy load path PH41.

According to the explanation in FIG. 8 above, when the photovoltaic voltage is still unstable, the dummy load can be provided through the power limiting circuit 450 so that the open circuit voltage does not float too much. When the auxiliary power supply 140 is fully enabled, the power limiting circuit 450 could release dummy load.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A maximum power point tracking (MPPT) device, comprising:
    a DC-to-DC converting circuit, connected to a photovoltaic array (PV array);
    a DC-to-AC inverting circuit, connected to the DC-to-DC converting circuit; a controlling circuit, connected to the DC-to-DC converting circuit and the DC-to-AC inverting circuit;
    an auxiliary power supply, connected to the DC-to-DC converting circuit, the DC-to-AC inverting circuit and the controlling circuit, for providing a power;
    a power limiting circuit, connected to the photovoltaic array and the auxiliary power supply, wherein the power limiting circuit includes:
        a dummy load path, used to provide a dummy load, when a photovoltaic power of the photovoltaic array is lower than a predetermined power, so as to stabilize a photovoltaic voltage of the photovoltaic array; and
        an auxiliary power providing path, used to enable the auxiliary power supply, when the photovoltaic power of the photovoltaic array is higher than or equal to the predetermined power;
    wherein the power limiting circuit further comprises a second transistor, connected to a second resistor, wherein when the second transistor is turned on, the second resistor and the second transistor form the auxiliary power providing path and release the dummy load;
    wherein the power limiting circuit further comprises a second capacitor connected to the second transistor, a fourth resistor, and a fifth resistor, wherein the second capacitor is connected to a second node connected between the fourth resistor and the fifth resistor, wherein when the second capacitor is charged to a second predetermined voltage by a second divided voltage between the fourth resistor and the fifth resistor, the second transistor is turned on to form the auxiliary power providing path; and
    a flyback circuit, connected to the auxiliary power supply, and wherein the power limiting circuit further comprises a diode, the second capacitor is connected to the diode, the diode is connected to a power supply voltage node connected between the flyback circuit and the auxiliary power supply to provide a power supply voltage for charging the second capacitor.

2. The maximum power point tracking device according to claim 1, wherein the power limiting circuit further comprises:
    a first resistor; and
    a first transistor, connected to the first resistor, wherein when the first transistor is turned on, the first resistor and the first transistor form the dummy load path.

3. The maximum power point tracking device according to claim 2, wherein the power limiting circuit further comprises:
    a first capacitor, connected to the first transistor, wherein when the first capacitor is charged to a first predetermined voltage, the first transistor is turned on to form the dummy load path.

4. The maximum power point tracking device according to claim 3, wherein the power limiting circuit further comprises:
    a third resistor, connected to the second resistor, wherein the first capacitor is connected to a first node connected between the second resistor and the third resistor, and a first divided voltage between the second resistor and the third resistor charges the first capacitor.

5. The maximum power point tracking device according to claim 4, wherein the second divided voltage is lower than the first divided voltage.

6. An operation method of a maximum power point tracking (MPPT) device including a power limiting circuit, comprising:
    forming a dummy load path to provide a dummy load to stabilize a photovoltaic voltage of a photovoltaic array, when a photovoltaic power of the photovoltaic array is lower than a predetermined power; and
    forming an auxiliary power providing path to enable an auxiliary power supply, when the photovoltaic power of the photovoltaic array is higher than or equal to the predetermined power;
    wherein the power limiting circuit further comprises a second transistor, connected to a second resistor, and wherein forming the auxiliary power providing path comprises turning on the second transistor such that the second resistor and the second transistor form the auxiliary power providing path and release the dummy load;
    wherein the power limiting circuit further comprises a second capacitor connected to the second transistor, a fourth resistor, and a fifth resistor, wherein the second capacitor is connected to a second node connected between the fourth resistor and the fifth resistor, wherein turning on the second transistor comprises charging the second capacitor to a second predetermined voltage by a second divided voltage between the fourth resistor and the fifth resistor; and
    wherein the MPPT device comprises a flyback circuit, connected to the auxiliary power supply, and wherein the power limiting circuit further comprises a diode, the second capacitor is connected to the diode, the diode is connected to a power supply voltage node connected between the flyback circuit and the auxiliary power supply to provide a power supply voltage, wherein charging the second capacitor further comprises providing the power supply voltage for charging the second capacitor.

7. The operation method of the maximum power point tracking device according to claim 6, wherein when a transistor is turned on, the photovoltaic power of the photovoltaic array is higher than or equal to the predetermined power.

8. A power limiting circuit connected to a photovoltaic array and an auxiliary power supply, wherein the power limiting circuit comprises:
   a dummy load path, used to provide a dummy load, when a photovoltaic power of the photovoltaic array is lower than a predetermined power, so as to stabilize a photovoltaic voltage of the photovoltaic array; and
   an auxiliary power providing path, used to enable the auxiliary power supply, when the photovoltaic power of the photovoltaic array is higher than or equal to the predetermined power;
   wherein the power limiting circuit further comprises a second transistor, connected to a second resistor, wherein when the second transistor is turned on, the second resistor and the second transistor form the auxiliary power providing path and release the dummy load;
   wherein the power limiting circuit further comprises a second capacitor connected to the second transistor, a fourth resistor, and a fifth resistor, wherein the second capacitor is connected to a second node connected between the fourth resistor and the fifth resistor, wherein when the second capacitor is charged to a second predetermined voltage by a second divided voltage between the fourth resistor and the fifth resistor, the second transistor is turned on to form the auxiliary power providing path; and
   wherein a flyback circuit is connected to the auxiliary power supply, and wherein the power limiting circuit further comprises a diode, the second capacitor is connected to the diode, the diode is connected to a power supply voltage node connected between the flyback circuit and the auxiliary power supply to provide a power supply voltage for charging the second capacitor.

9. The power limiting circuit according to claim 8, further comprising:
   a first resistor; and
   a first transistor, connected to the first resistor, wherein when the first transistor is turned on, the first resistor and the first transistor form the dummy load path.

10. The power limiting circuit according to claim 9, further comprising:
    a first capacitor, connected to the first transistor, wherein when the first capacitor is charged to a first predetermined voltage, the first transistor is turned on to form the dummy load path.

11. The power limiting circuit according to claim 10, further comprising:
    a third resistor, connected to the second resistor, wherein the first capacitor is connected to a first node connected between the second resistor and the third resistor, and a first divided voltage between the second resistor and the third resistor charges the first capacitor.

12. The power limiting circuit according to claim 11, wherein the second divided voltage is lower than the first divided voltage.

* * * * *